(12) United States Patent
Edwards

(10) Patent No.: US 8,255,465 B2
(45) Date of Patent: Aug. 28, 2012

(54) NETWORK COMMUNICATIONS

(75) Inventor: John Edwards, London (GB)

(73) Assignee: ScanSafe Limited, London (GB)

( * ) Notice: Subject to any disclaimer, the term of this patent is extended or adjusted under 35 U.S.C. 154(b) by 1343 days.

(21) Appl. No.: 11/534,604

(22) Filed: Sep. 22, 2006

(65) Prior Publication Data

US 2007/0074018 A1     Mar. 29, 2007

Related U.S. Application Data

(60) Provisional application No. 60/727,525, filed on Oct. 17, 2005.

(30) Foreign Application Priority Data

Sep. 23, 2005   (GB) .................................. 0519466.7

(51) Int. Cl.
  *G06F 15/16* (2006.01)
  *G06F 13/00* (2006.01)
  *G06F 11/00* (2006.01)
(52) U.S. Cl. ........ 709/206; 709/202; 709/207; 713/176; 713/150; 713/152; 713/171; 713/168; 380/270; 380/285; 455/410; 455/411; 726/3; 726/4; 726/5; 726/6; 726/21; 726/22; 726/23; 726/24; 726/25; 726/26; 726/28; 726/29; 726/30
(58) Field of Classification Search .......... 709/246–247, 709/202, 206–207; 713/150, 168, 181, 176, 713/200, 171, 152; 380/270, 285; 455/410, 455/411; 726/3, 4, 5, 6, 21, 22, 23, 24, 26, 726/28, 29, 30
See application file for complete search history.

(56) References Cited

U.S. PATENT DOCUMENTS

| | | | | | |
|---|---|---|---|---|---|
| 4,405,829 | A | * | 9/1983 | Rivest et al. | 380/30 |
| 4,866,707 | A | * | 9/1989 | Marshall et al. | 714/749 |
| 4,888,800 | A | * | 12/1989 | Marshall et al. | 380/281 |
| 4,933,969 | A | * | 6/1990 | Marshall et al. | 713/177 |
| 6,052,730 | A | * | 4/2000 | Felciano et al. | 709/225 |
| 6,067,620 | A | * | 5/2000 | Holden et al. | 713/155 |
| 6,081,900 | A | * | 6/2000 | Subramaniam et al. | 726/19 |

(Continued)

FOREIGN PATENT DOCUMENTS

EP     1 533 982 A3     5/2005

(Continued)

OTHER PUBLICATIONS

Inoue, Atsushi et al.: "IP Layer Security and Mobility Support Design Policy and an Implementation," International Switching Symposium 1997, XVI World Telecommunications Congress Proceedings, Sep. 21-26, 1997, pp. 571-577.

(Continued)

*Primary Examiner* — John Follansbee
*Assistant Examiner* — Saket K Daftuar

(57) ABSTRACT

Methods and systems for communicating information between computer networks in which the information to be communicated is required at one location (e.g. for processing) but only available at another location. The information may be absent deliberately (for privacy reasons) or may simply be unavailable as an artifact of the computer network(s) involved. The required information, such as the internal client IP address, is inserted into the outgoing network communication in a manner that does not to materially affect the normal transit or utility of the network communication (e.g. as custom headers). The information is preferably inserted in an encrypted form, so that it may pass over a public network and be invulnerable to unauthorised scrutiny.

32 Claims, 2 Drawing Sheets

U.S. PATENT DOCUMENTS

| | | | | |
|---|---|---|---|---|
| 6,212,636 | B1* | 4/2001 | Boyle et al. | 713/168 |
| 6,483,921 | B1* | 11/2002 | Harkins | 380/286 |
| 6,643,698 | B2* | 11/2003 | Holden et al. | 709/225 |
| 6,839,717 | B1* | 1/2005 | Motoyama et al. | 1/1 |
| 7,240,199 | B2* | 7/2007 | Tomkow | 713/168 |
| 7,246,378 | B1* | 7/2007 | Marvit et al. | 726/29 |
| 7,277,549 | B2* | 10/2007 | Olkin et al. | 380/277 |
| 7,454,785 | B2* | 11/2008 | Kerstens et al. | 726/12 |
| 7,552,476 | B2* | 6/2009 | Slick et al. | 726/22 |
| 7,607,018 | B2* | 10/2009 | Baxter et al. | 713/176 |
| 7,660,989 | B2* | 2/2010 | Tomkow | 713/170 |
| 7,707,624 | B2* | 4/2010 | Tomkow | 726/5 |
| 7,886,008 | B2* | 2/2011 | Tomkow et al. | 709/206 |
| 2001/0034622 | A1 | 10/2001 | Davis | |
| 2002/0007415 | A1* | 1/2002 | Douglis et al. | 709/230 |
| 2002/0026328 | A1 | 2/2002 | Westerkamp et al. | |
| 2002/0062230 | A1* | 5/2002 | Morag et al. | 705/3 |
| 2002/0120697 | A1* | 8/2002 | Generous et al. | 709/206 |
| 2002/0138728 | A1* | 9/2002 | Parfenov et al. | 713/170 |
| 2002/0194121 | A1* | 12/2002 | Takayama | 705/39 |
| 2003/0074552 | A1* | 4/2003 | Olkin et al. | 713/150 |
| 2003/0172120 | A1* | 9/2003 | Tomkow et al. | 709/206 |
| 2004/0088539 | A1* | 5/2004 | Infante et al. | 713/153 |
| 2004/0123159 | A1* | 6/2004 | Kerstens et al. | 713/202 |
| 2004/0148500 | A1* | 7/2004 | Olkin et al. | 713/150 |
| 2004/0196978 | A1* | 10/2004 | Godfrey et al. | 380/270 |
| 2004/0205330 | A1* | 10/2004 | Godfrey et al. | 713/150 |
| 2004/0221014 | A1* | 11/2004 | Tomkow | 709/206 |
| 2005/0009502 | A1* | 1/2005 | Little et al. | 455/411 |
| 2005/0010766 | A1* | 1/2005 | Holden et al. | 713/166 |
| 2005/0021963 | A1* | 1/2005 | Tomkow | 713/171 |
| 2005/0026328 | A1 | 2/2005 | Watanabe | |
| 2005/0071508 | A1* | 3/2005 | Brown et al. | 709/246 |
| 2005/0102520 | A1* | 5/2005 | Baxter et al. | 713/176 |
| 2005/0119955 | A1 | 6/2005 | Dang et al. | |
| 2005/0163320 | A1* | 7/2005 | Brown et al. | 380/270 |
| 2005/0198511 | A1* | 9/2005 | Tomkow | 713/176 |
| 2005/0271246 | A1* | 12/2005 | Sharma et al. | 382/100 |
| 2006/0112165 | A9* | 5/2006 | Tomkow et al. | 709/206 |
| 2006/0123479 | A1* | 6/2006 | Kumar et al. | 726/23 |
| 2006/0165231 | A1* | 7/2006 | Srungaram | 380/30 |
| 2006/0209828 | A1* | 9/2006 | Ng et al. | 370/392 |
| 2007/0074018 | A1 | 3/2007 | Edwards | |

FOREIGN PATENT DOCUMENTS

| | | |
|---|---|---|
| GB | 2375918 A | 11/2002 |
| WO | 0073876 A2 | 12/2000 |

OTHER PUBLICATIONS

Hunt, "Modify Headers Overview", http://modifyheaders.mozdev.org/, (1 page).

Gartner, "Gartner Says Security Delivered as a Cloud-Based Service Will More Than Triple in many Segments by 2013", Press Release, Stamford, CT, Jul. 2008, (3 pages).

Hayes, "Cloud Computing", Communications of the ACM, vol. 51, No. 7, Jul. 2008, (pp. 9-11).

Rietta et al., "Firefox Extension Development Tutorial: Overview", Rietta.com, Rietta Inc., Johns Creek, GA, 1999-2012, (4 pages).

Jia C., "How to Attach to Browser Helper Object (BHO) with C# in two minutes", The Code Project, Aug. 10, 2007, (6 pages).

* cited by examiner

NETWORK COMMUNICATIONS

RELATED APPLICATIONS

This application is a utility patent application based on U.S. Provisional Patent Application No. 60/727,525 filed on Oct. 17, 2005 and U.K. Patent Application No. 0519466.7 filed on Sep. 23, 2005, the benefits of which are hereby claimed under 35 U.S.C. §119 and the disclosures of which are herein incorporated by reference in their entirety.

FIELD OF THE INVENTION

The present invention relates to network communications and provides methods, systems and related software components for communicating information between networked processors and applications running on those processors. In its preferred forms the invention is particularly, although not necessarily exclusively, applicable to communication between a user processor (e.g. within a corporate environment) and the processor of an internet level network processing service (e.g. a web security service).

BACKGROUND

Network processing services, such as web security services (e.g WebSense, SurfControl), mail processing services (e.g. Mailsweeper) or IM ("instant messaging") processing services (e.g. IMLogic, Facetime) are conventionally deployed within or at the perimeter of a corporate computer network. Operating within the corporate environment has several disadvantages, including the costs associated with installation and maintenance of the service and the hardware on which it runs. If the service is to remain current and up to date, regular upgrades are often needed, adding to these burdens associated with ownership.

On the other hand, locally hosted services like this have the benefit that they have ready access to local (i.e. corporate) network information (e.g. user information available from a local network directory and network traffic information). The information may be useful, or even essential, for provision of the service, as it can be used to selectively process requests or other network communications received by the service and can enable more granular auditing in relation to the operation of the service and the activities of the users.

The costs and other disadvantages associated with locally owned and hosted services have led to a growth in managed services provide by third parties, typically hosted off-site, communicating with the corporate network via an external network, very often an unsecured external network such as the Internet.

Such managed services afford a multitude of benefits to users, including no installation or maintenance costs, regularly updated/upgraded services and generally more stable and faster processors running the service.

These managed services suffer from the drawback, however, that they cannot access certain local network information, such as private corporate network details (e.g. internal IP address, user name, directory group membership, quota usage and local time), as this information is generally absent when network communications leave the corporate network (via the firewall), either as an artefact of the firewall operation or through deliberate removal for security reasons. This seriously limits the functionality that can be provided by internet-level network processing services.

SUMMARY OF THE INVENTION

It is a general aim of the present invention to increase the functionality of internet-level network processing services (e.g. web security services). The proposal is to append (preferably in an encrypted form) additional, local network information (i.e. information not normally available outside the local (e.g. corporate) network environment), to network communications sent from a user processor connected to the local network to remote processor connected to the local network via an external network (e.g. the Internet).

In general, the invention is concerned with methods and systems for communicating information between computer networks in which the information to be communicated is required at one location (e.g. for processing) but only available at another location. The information may be absent deliberately (for privacy reasons) or may simply be unavailable as an artefact of the computer network(s) involved. The required information, such as the internal client IP address, is inserted into the outgoing network communication in a manner that does not to materially affect the normal transit or utility of the network communication (e.g. as custom headers). The information is preferably inserted in an encrypted form, so that it may pass over a public network and be invulnerable to unauthorised scrutiny.

In a first aspect, the present invention provides a method of appending a message appendix to a network communication sent from a user processor connected to a local network to a remote processor that is connected to the local network via an external network, the method comprising:

creating a message appendix including information additional to the content of the network communication;
encrypting the message appendix; and
appending the encrypted message appendix to the network communication.

The message appendix may be appended to the network communication during or immediately after creation of the network communication, before it is sent from the user processor. Alternatively, the network communication may be intercepted after it is sent (prior to receipt by the remote processor, and preferably before it leaves the local network) and modified, after it is intercepted, to include the message appendix. The network message can then be released to continue its transit to the remote processor via the external network.

Whether the appendix is added to the network communication on origination or through subsequent interception of the communication, the message appendix can be interrogated by a decoder at the remote processor to extract the additional information contained in it that would not otherwise have been available to the remote processor.

This provision of additional information to the remote processor is accomplished whilst maintaining the integrity and security of the additional information, making this aspect of the invention particularly appropriate for use in the provision of internet-level network processing services, the message appendix being used to provide local network information (not normally available outside of the local network environment) in a secure manner to the remotely located processor running the network processing service.

In some embodiments of the invention it may not be necessary to encrypt the message appendix. This is particularly the case where the network communication is itself being transmitted via a secure connection (e.g. over a VPN).

The appendix may comprise multiple discrete appendix sections, for example where the information to be added is too long to be added as a single entity (due to the constraints of the network communication protocol for instance). In this case, the decoder can extract all of the appendix sections and amalgamate them as required to obtain the complete information.

It is also not essential that the appendix (or multiple appendix sections) be created in one operation at a single network location. The appendix can, as an alternative, be compiled in a number of consecutive steps, carried out at the same or two or more different network locations. For example, in a hierarchical corporate network structure, some information may be added to the appendix at the local (e.g. branch) level, more information at a regional level and still more information at a global level. Where a series of encoders are employed at different network locations in this way, each subsequent encoder may add a new appendix section (avoiding the need to decode the existing appendix information) or it may add further information to an existing appendix section (in which case it will generally be necessary to decode the existing information, add to it, and then re-encode the total content of the appendix).

The additional information contained within the message appendix may be, as suggested above, local (e.g. corporate) network information, such as user or group level information, for example a user's (e.g. the network communication originator's) user ID, group membership, phone number, location, address or other information available from a local network directory or directories (e.g. corporate directory).

Alternatively or additionally, the additional information may include other data associated with the network communication (e.g. IP address, MAC address, NTLM authentication header or other HTTP headers), derived data such as a tally of connections or data transfer sizes made by a specific user (determined by e.g. IP address, MAC address or username) or group, or a local network time when a connection is made, or other information independent of the specific network communication, such as a tally of total connections or data transfer sizes, CPU load, etc.

In a second aspect, the invention provides a method of providing a network processing service to users of a local network, the network processing service being hosted remotely to the local network and connected to the local network by an external network, the method comprising, at the remote network processing service:

receiving a network communication from the user via the external network, the network communication including an encrypted message appendix;

extracting and decrypting the message appendix; and processing the network communication dependent on information contained in the decrypted message appendix.

Particularly if the network communication is to be forwarded on, the message appendix may be removed from the network communication once received by the network processing service.

In a third aspect, the invention provides a method of appending a message appendix to a network communication sent from a user processor connected to a local network to a remote processor that is connected to the local network via an external network, the method comprising:

creating a message appendix including information additional to the content of the network communication; and appending the message appendix to the network communication;

wherein said information additional to the content of the network communication comprises one or more of:

a) local network information available from a directory or directories associated with the local network;

b) state information about the local network and/or the user and/or a user group; and c) tally information about the local network and/or the user and/or user group.

The message appendix may be appended to the network communication during or immediately after creation of the network communication, before it is sent from the user processor. Alternatively, the network communication may be intercepted after it is sent (prior to receipt by the remote processor, and preferably before it leaves the local network) and modified, after it is intercepted, to include the message appendix.

Preferably, the message appendix is encrypted before it is included in the network communication.

In a fourth aspect, the invention provides providing a method of providing a network processing service to users of a local network, the network processing service being hosted remotely to the local network and connected to the local network by an external network, the method comprising, at the remote network processing service:

receiving a network communication from the user via the external network, the network communication including a message appendix;

extracting the message appendix; and processing the network communication dependent on information contained in the message appendix;

wherein said information in the appendix on which the processing of the network communication depends comprises one or more of:

a) local network information obtained from a directory or directories associated with the local network;

b) state information about the local network and/or the user and/or a user group; and c) tally information about the local network and/or the user and/or user group.

As with the second aspect, the message appendix may be removed from the network communication once received by the network processing service.

In the third and fourth aspects of the invention, the local (e.g. corporate) network information may be user or group level information, for example a user's (e.g. the network communication originator's) user ID, group membership, phone number, location, address or other information available from a local network directory (e.g. corporate directory).

The state information may include other data associated with the network communication (e.g. IP address, MAC address, NTLM authentication header or other HTTP headers), derived data such as a tally of connections or data transfer sizes made by a specific user (determined by e.g. IP address, MAC address or username) or group, or a local network time when a connection is made, or other information independent of the specific network communication, such as a tally of total connections or data transfer sizes, CPU load, etc.

One benefit of incorporating such information in the message appendix is that it might be used to guard against replay attacks (i.e. interception and re-sending of a message appendix by a malicious third party). More specifically, if the appendix includes time-specific information, tally information or other information (or combinations of information) that make each appendix unique, then appendices received at the decoder can be compared with a cache of previously received appendices. If the newly received appendix corresponds to a previously received one, it can be inferred to be malicious attempt to gain unauthorised access to the service and appropriate action can be taken (e.g. access denied).

Preferably, therefore, each message appendix is unique.

The invention also provides systems that can operate in accordance with the methods discussed above.

Accordingly, in a fifth aspect, the invention provides a network processing service for processing a network communication sent from a user processor connected to a local network to a remote processor that is connected to the local network via an external network, the system comprising:
an encoding agent that operates to:
create a message appendix including information additional to the content of the network communication;
encrypt the message appendix; and
append the encrypted message appendix to the network communication to create a modified network communication;
a decoding agent at said remote processor that operates to:
receive the modified network communication from the user via the external network; and
extract and decrypt the message appendix;
and
a processing agent that subsequently processes the network communication, the processing being dependent on information contained in the decrypted message appendix.

In a sixth aspect the invention provides a system for appending a message appendix to a network communication sent from a user processor connected to a local network to a remote processor that is connected to the local network via an external network, the system comprising an encoding agent that operates to:
create a message appendix including information additional to the content of the network communication;
encrypt the message appendix; and
append the encrypted message appendix to the network communication.

The encoding agent of the fifth and sixth aspects may additionally operate to intercept the network communication in order to append the message appendix to it. Alternatively, the encoding agent may be located at (or be integrated with) the originator of the network communication (e.g. Web Browser, IM client, VOIP client or handset) rather than operating at some intermediate interception point. A "plugin component" e.g. a web browser "BHO" (browser help object) is one example of a possible integrated encoding agent.

In a seventh aspect, the invention provides a network processing service for users of a local network, the network processing service being hosted remotely to the local network and connected to the local network by an external network, the remote network processing service comprising:
a decoding agent that operates to:
receive a network communication from the user via the external network, the network communication including an encrypted message appendix; and
extract and decrypt the message appendix,
and
a processing agent that subsequently processes the network communication, the processing being dependent on information contained in the decrypted message appendix.

In an eighth aspect, the invention provides a network processing service for processing a network communication sent from a user processor connected to a local network to a remote processor that is connected to the local network via an external network, the system comprising:
an encoding agent that operates to:
create a message appendix including information additional to the content of the network communication; and
append the message appendix to the network communication to create a modified network communication;
a decoding agent at said remote processor that operates to:
receive the modified network communication from the user via the external network; and
extract the message appendix;
and
a processing agent that subsequently processes the network communication, the processing being dependent on information contained in the extracted message appendix;
wherein said information additional to the content of the network communication comprises one or more of:
a) local network information available from a directory or directories associated with the local network;
b) state information about the local network and/or the user and/or a user group; and
c) tally information about the local network and/or the user and/or user group.

In a ninth aspect, the invention provides a system for appending a message appendix to a network communication sent from a user processor connected to a local network to a remote processor that is connected to the local network via an external network, the system comprising and encoding agent that operates to:
create a message appendix including information additional to the content of the network communication; and
append the message appendix to the network communication;
wherein said information additional to the content of the network communication comprises one or more of:
a) local network information available from a directory or directories associated with the local network;
b) state information about the local network and/or the user and/or a user group; and
c) tally information about the local network and/or the user and/or user group.

The encoding agent of the eighth and ninth aspects may additionally operate to intercept the network communication in order to append the message appendix to it. Alternatively, the encoding agent may be located at (or be integrated with) the originator of the network communication (e.g. Web Browser, IM client, VOIP client or handset) rather than operating at some intermediate interception point. A "plugin component" e.g. a web browser "BHO" (browser help object) is one example of a possible integrated encoding agent.

In a tenth aspect, the invention provides providing a network processing service for users of a local network, the network processing service being hosted remotely to the local network and connected to the local network by an external network, the network processing service comprising:
a decoding agent that operates to:
receive a network communication from the user via the external network, the network communication including a message appendix; and
extract the message appendix;
and
a processing agent that operates to process the network communication, the processing being dependent on information contained in the message appendix;
wherein said information in the appendix on which the processing of the network communication depends comprises one or more of:
a) local network information obtained from a directory associated with the local network; and
b) state information about the local network and/or the user.

In the various aspects of the invention set forth above, state information included in the message appendix might optionally include or be used as a "key" or "keys" to be used by the Decoding Agent to look up additional details from a database accessible by the Decoding Agent which are not present in the Message Appendix. For example, state information such as the IP address or MAC address of the user's device and/or their User ID might be included in the message appendix and subsequently used by the Decoding Agent to lookup, for example, additional user-specific or user-group-specific information (e.g. directory information) from one or more databases accessible to the Decoding Agent. This approach may be used to authenticate the user to the network processing service, for example, and/or the lookup information may be used in the subsequent processing of the network communication.

In systems according to the invention, the encoding agent can be located at any point in the network path, and will generally be located, for example, at:
  a client PC
  a general purpose corporate server
  a dedicated corporate proxy server In some embodiments of the invention, however, the encoding agent may be located at:
  general purpose ISP/ASP proxy server
  dedicated ISP/ASP proxy server
  any other location that could host a network proxy application For example, in some cases it may be that the ISP is party to additional information that is wanted for the message appendix that is not available at the client PC or the corporate server, for example the ISP account number or other ISP account data. Such information could be added at the ISP proxy server.

The decoding agent can be located for example at:
  a general purpose ISP/ASP proxy server;
  a dedicated ISP/ASP proxy server; or
  any other location that could host a network proxy application In the various aspects of the invention set forth above, the network communication may be any of a number of different types of communication, including for example an HTTP request, email communications (e.g. SMTP, POP3, IMAP4, MIME) and Instant Messaging (IM) communications.

Whatever the format of the network communication, the additional information to be provided to the remote processor in accordance with preferred embodiments of the present invention in effect 'piggybacks' on the existing (standard) communication (by way of the message appendix, which is directly embedded in the network communication). No additional network connections are required.

In other embodiments of the present invention, the appendix may be transmitted as a separate network communication associated with, but not embedded in, the original network communication, although in such cases the message appendix preferably still shares the same connection between the user processor and remote processor as the original network communication.

Where the message appendix is to be embedded in the network communication it can be incorporated in any appropriate way. Thus, it may be added to the body of the communication but more preferably, where possible, it is added to header information in the communication. For example, where the network communication is an HTTP request, the message appendix can be added as a custom header (e.g. using the "X-" prefix).

The various aspects of the present invention may be used in the implementation of a variety of remotely hosted network processing services (e.g. Internet-level network processing services). Examples include web security services, including web virus scanning, web filtering and web spyware screening. The additional information included in the message appendix can be used to tailor the services, for example to the specific user from which the network message originates (e.g. different web filtering parameters can be applied to different users).

The local network will typically be a corporate network, but the various aspects of the application are not necessarily limited to such applications. Other 'local networks' to which aspects of the present invention are applicable include single PCs, home networks or ISP networks or a combination of such local networks.

Similarly, in currently envisaged applications of the present invention, the external network will typically be the Internet but the invention is applicable to other external networks. The term external network as used herein is intended to mean any network other than the local network. Typically the information contained within the message header will be information that is available from the local network and not normally available to processors connected to the external network.

The term remote as used herein refers to e.g. processors, other devices, agents, other software components and applications that are not directly connected to the local network. Whilst things that are remote from the local network will often also be physically remote, this need not necessarily be the case.

The invention also provides software that when run on a computer or computer network causes the computer or network to operate in accordance with any one or more of the methods according to aspects of the invention set forth above.

BRIEF DESCRIPTION OF THE DRAWINGS

Embodiments of the invention are described below, by way of example, with reference to the accompanying drawings, in which.

DETAILED DESCRIPTION

Figure 1:
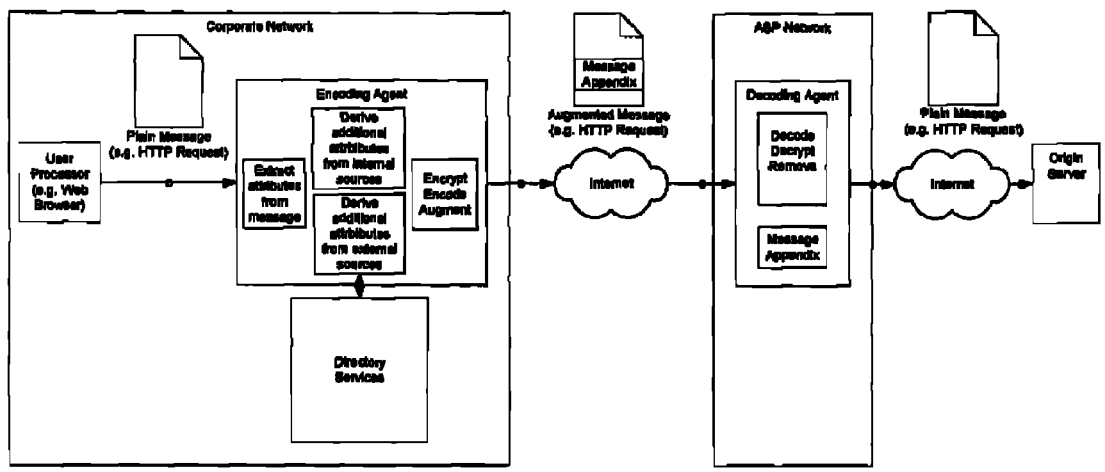
FIG. 1 is a schematic of a system in accordance with a generically applicable embodiment of the present invention as deployed in a corporate network.

Embodiments of the present invention are generally concerned with systems for communicating information between computer networks whereby the information to be communicated is required at one location (e.g. for processing) but only available at another location. The information may be absent deliberately (for privacy reasons) or may simply be unavailable as an artefact of the computer network(s) involved.

Embodiments of the present invention provide a solution to the above problem by inserting information, such as the internal client IP address, into the outgoing network communication. The information is preferably inserted so as not to materially affect the normal transit or utility of the information (e.g. as custom headers). The information is preferably inserted in an encrypted form, so that it may pass over a public network and be invulnerable to unauthorised scrutiny. The encryption mechanism should preferably use a combination of asymmetric encryption to avoid the need to exchange private keys, plus symmetric encryption to maximise performance.

Embodiments of the present invention are particularly useful where the communication is an HTTP request, however the invention is equally useful where the communication is an email, or IM (Instant Messaging) message, or any other network communication which may require details that are only available at one location to be communicated to another location.

The information will generally relate to the identity or activity of the user processor. However, the information may be any other kind of message.

Embodiments of the invention provide the ability to communicate information transparently (i.e. makes uses of existing network flows and does not materially affect these) and securely (i.e. so that any sensitive data that has been deliberately removed for privacy reasons is not transmitted in a form that is discernible by any third party).

Embodiments of the present invention can be implemented in software loadable onto computers (e.g. client and/or server computers). To allow quick, easy, platform independent deployment of embodiments of the present invention, the software preferably comprises one or more Java applications. In preferred embodiments of the present invention, as explained in more detail below, applications are stored and executed on one or more computers within the corporate environment and filter HTTP, SMTP and IM data passing through them.

Preferably embodiments of the present invention comprise the facility to isolate certain attributes of the electronic communication and use these to interrogate a directory service. In a preferred embodiment of the present invention the IP address of the user processor is obtained from the electronic communication and used to derive the user name, group membership and other directory attributes from a directory service.

In an alternative preferred embodiment of the present invention, the username of the user processor is obtained from the electronic communication and used to derive the user name, group membership and other directory attributes from a directory service.

Referring now to FIG. 1, it can be seen that the system includes two main components, an Encoding Agent located with the corporate network and the Decoding Agent remote from the corporate network, hosted for example by an application service provider (ASP).

Both the encoding agent and decoding agent act on a network communication (referred to as a 'Message' in the following). The Message will typically be a Network Message (e.g. an HTTP Request). Network Messages will typically comprise Message Headers and a Message Body. The Message Headers typically contain control and processing information (e.g. HTTP Request Headers)

The Encoding Agent intercepts the Plain Message, then creates, encrypts and encodes a Message Appendix and adds this to the Plain Message to create an Augmented Message.

The Decoding Agent intercepts the Augmented Message, then extracts (and optionally removes) the Message Appendix, and decodes and decrypts the contents of the appendix. The Augmented Message may have been processed and changed by other intermediate processes between the Encode and Decode processes, however the Encoding Agent adds the Message Appendix in a form that will not be altered by these processes and can therefore be extracted intact by the Decoding Agent. Due to these interstitial modifications, removing the Message Appendix from the Augmented Message will not necessarily result in a Message identical to the original Plain Message.

Both Encoding Agent and Decoding Agent are installed on the network path, such that they are in a position to modify the Message (e.g. acting as, or in conjunction with, a network proxy or relay.) The Encoding Agent will be installed earlier in the network path than the Decoding Agent i.e. so that the Message Appendix is available to the Decoding Agent.

Some embodiments of the present invention employ multiple Encoding Agents and/or Decoding Agents that act on the Message in series.

Whilst, as noted above, the Decoding Agent of some embodiments of the invention can modify the Message, e.g. by removing the Message Appendix, this is not mandatory. In cases where the Appendix remains with the Message, even if forwarded on, the content of the Appendix is secure and not readable by any unauthorised third party.

The summary of operation of the system of FIG. 1 is as follows:
  Message intercepted by Encoding Agent
  Encoding Agent generates a Message Appendix based on:
    Message Attributes extracted directly from the Network Message
    Externally Derived Attributes derived by querying external services using zero or more Message Attributes or Derived Attributes as query parameters (e.g. looking up directory group membership using the IP or username from the client connection)
    Internally Derived Attributes derived by querying services internal to the Encoding Agent using zero or more Message Attributes or Derived Message Attributes as query parameters (e.g. tally of bytes transferred for a particular user or group, local time)
  Encoding Agent encrypts the Message Appendix using a suitable encryption mechanism. The current invention uses a combination of Asymmetric encryption and Symmetric encryption:
    A Symmetric Session Key (e.g. 3DES) is generated dynamically or retrieved from a temporary local cache within the Encoding Agent.
    The Message Appendix is encrypted using the Session Key—this provides very fast and strong encryption and subsequent decryption.
    The Session Key is encrypted using the Decoding Agent Public Key (uses asymmetric encryption e.g. RSA.). Again, performance is enhanced by caching the Encrypted Session Key. (Note: periodically the session key is regenerated and the cache cleared. This is configurable to provide an optimal balance between security and performance).
  Encoding Agent encodes the encrypted Message Appendix so that it may be added to the Message in a form that does not materially impede or alter the transmission or meaning of the original Message. Both pieces of data (Encrypted Session Key, Encrypted data) are encoded separately for addition to the Message. In the case of the HTTP Network Agent, the Message Appendix is added as a custom header (prefixed with "X-")
  Encoding Agent modifies the Original Message to include the Message Appendix. The Augmented Message is released to carry on its transit over the network. (the Encoding Agent may or may not be actively involved in the delivery process)

The Modified Message may be intercepted by a further Encoding Agent, which can add a further Message Appendix or modify the existing Message Appendix The Decoding Agent intercepts the Augmented Message and extracts, decodes and decrypts the Message Appendix (In the case where multiple Message Appendices are attached these may be handled by a single Decoding Agent or multiple Decoding Agents in series).

The contents of the Message Appendix may be used for any processing task, which may include further processing or blocking of the Message (e.g. as part of a Managed Web Security service)

The Decoding Agent may optionally remove the Message Appendix before forwarding the Message further along the network.

In some embodiments of the invention, a static Message Appendix or equivalent may be generated, stored in a form that is accessible to the Encoding Agent, and embedded within each dynamic Message Appendix.

The static Message Appendix can include a wide range of information, but typically it will be used to provide static user granularity data rather than requiring look up against a local directory service. This static data can be entered in advance manually or alternatively via a one-off/infrequent Directory lookup for example; results are cached permanently/semi-permanently by the Encoding Agent.

Such static Message Appendices need not be embedded, however embedding within a standard Dynamic Message Appendix ensures that the static Message Appendix is not visible in transit and is not, for example, vulnerable to replay attack.

Figure 2:
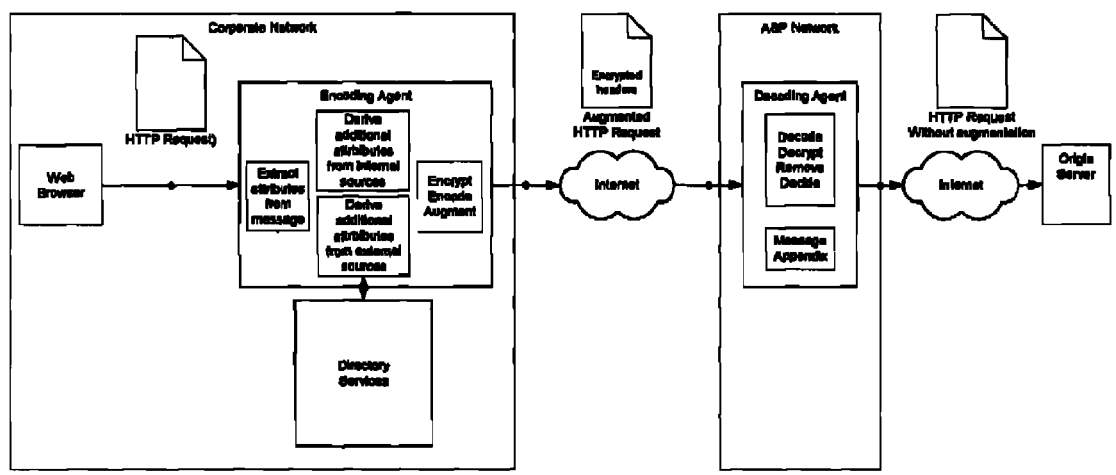
FIG. 2 is a schematic of an HTTP service in accordance with another embodiment of the present invention.

FIG. 2 illustrates a more specific exemplary application of an embodiment of the present invention serving as an HTTP proxy. In this case, the system includes:

A local network proxy server or server extension (AGENT)
Service provider proxy server or server extension (PROXY)
It is assumed that the local network has typical resources:
User authentication service (e.g. Windows domain or a Directory server LDAP for user authentication)
Firewall or transparent firewall that requires all HTTP clients to use AGENT as their proxy server When a user issues a HTTP request, the AGENT intercepts it. The AGENT then issues a request for HTTP authentication back to the client.

One of the authentication schemes for HTTP that may be used is NTLM. When using NTLM, the authentication data is automatically sent to the AGENT, without prompting the user for their credentials.

Authentication data is then verified with the authentication service (e.g. Windows Domain Controller). Further data about the user may also be obtained from the authentication service, for example, authentication groups that the user belongs to. The Encoding Agent may be configured so as not to enforce verification of NTLM credentials, which is of potential use in situations where unverified NTLM credentials are available, but verification is not.

Further data may be collected about the user and the request, such as local time, tallies of user's request etc.; this information may be obtained from directly within the AGENT, or alternatively from an external source.

The AGENT then performs the following steps to generate and add the message appendix:

Combine the separate data items into a single parseable message

Generates a symmetric session key (or retrieves one from the cache if present and not expired) and uses this to encrypt the data.

The symmetric session key is then encrypted itself using asymmetric encryption (RSA) using the public key of the PROXY. Again, a cache may be maintained of the encrypted session key, to avoid encrypting the same key every time.

The encrypted session key and the encrypted data are both encoded as hexadecimal strings, then added as two separate HTTP Headers, the encrypted session key header and the encrypted data header. An alternative encoding method (e.g. base64) could be used instead. If the encrypted data is considered to be too long for a single HTTP header, then it may be split across multiple HTTP headers as series of message appendix sections.

This augmented request is then sent to the upstream server (PROXY), typically over the open, insecure network.

The PROXY extracts the two encoded and encrypted headers, then performs the following steps to extract the original information:

decode the encrypted session key header (e.g. from hex to binary)
decrypt the session key header using the PROXY private key
decode the encrypted data (e.g. from hex to binary)
decrypt the encrypted data using the decrypted session key
parse the decrypted data into one or more separate data items The information obtained is then used to provide the service. For example, based on the user's group, the PROXY may decide not to service the request for a particular web site or a category of web sites (web filtering). Further, the request or response to the request (e.g. web content) may be infected by a virus. In either case, proxy may redirect the client to a particular page describing the nature of the restriction and reason for not servicing the request.

If the PROXY decides to handle the request, the headers added by the AGENT are removed from the request and the request is passed to the web server.

As already discussed, a key feature of embodiments of the invention is that, as illustrated by the example above, they allow details that would otherwise be unavailable at a certain network location to be securely and transparently communicated as part of normal network traffic.

Other preferred embodiments of the invention include any one or combinations of any two or more of the following:

Additional Data (information) is communicated without requiring additional connections ("piggy backs" on existing communication by way of the Message Appendix);
Data can be up to date, as can be queried live from internal directories;
Approach is applicable to HTTP, SMTP, POP, IM and any other network communication;
Data is preferably added as headers, but can equally modify the body, as the Decoder will be able to return the Message to its original form;
Encoding Agent is able to tie Responses to Requests allowing tallies of response size to be maintained;
Quotas—the Encoding agent includes a generic "tally" functionality which allows totals to be recorded;
Encoding Agent includes "caching" technology to reduce load on internal directories;
Encoding Agent include caching to reduce processing load when encrypting/encoding the Message Appendix;

Encoding process includes compression to reduce the size of the Message Appendix;

The Encoding Agent may optionally sign as well as encrypt the Message Appendix, which allows the Decoding Agent to verify the identity of the Sender;

The Encoding Agent includes NTLM challenge response processing so that username can be determined automatically in NTLM environments. It also includes authentication processing to verify the credentials. Verification may be disabled if the situation requires;

The Encoding Agent includes code to interrogate Windows NT, Windows Active Directory and generic LDAP directories;

The Encoding Agent includes code to act as a standalone proxy and also to integrate with mainstream ICAP proxies as well as ISA2000 and ISA2004 proxies;

A further benefit of embodiments of the present invention is that the software used to implement it can be location independent and can be located at any point in the network path including, but not limited to:
- client PC
- general purpose corporate server
- dedicated corporate http proxy server
- general purpose ISP/ASP http proxy server
- dedicated ISP/ASP http proxy server
- any other location that could host a network proxy application In embodiments of the present invention, the "Message Appendix" will typically comprise user/group level information, however it can include any data available to the Encoding Agent e.g.
- extracted directly from the connection e.g.
  - IP address
  - MAC address
  - NTLM authentication header
  - Other HTTP headers (may otherwise be removed by upstream proxy)
- external derivative of the connection
  - directory lookup using the IP or username from the client connection e.g.
    - group membership
    - phone number
    - address
    - any other information that may be stored in the corporate directory
- internal derivative of an attribute of the connection, or of one of the external derivatives
  - a tally of connections/transfer sizes made by a specific internal IP address/username/MAC address
  - local server time when the connection occurred
- data independent of the specific connection e.g. details of server environment where agent is running, CPU load, total tally of connections.
- additional parameters in the Encoding Agent, to be subsequently read by the Decoding Agent (these additional parameters may be encrypted/signed so that they may not be read or tampered with).
- a "key" or "keys" (e.g. a pre-existing value such as the IP address or MAC address of the user's device and/or their user ID, or a specific "key" created for the purpose) to be used by the Decoding Agent to look up additional details from a database accessible by the Decoding Agent which are not present in the Message Appendix.

To explain an example of the "key"/"keys" noted above, the Encoding Agent may be configured with a "license key" which is added to each Message Appendix and subsequently decoded by an upstream Decoding Agent.

The "license key" may, for example, be a unique account number which the Managed Service looks up against a database of license keys in order to determine additional parameters which are not available within the Message Appendix.

This feature can then be utilized to provide additional functionality, including one or both of;
1. enabling trusted access to the Managed Web Security Service without requiring static IP lockdown. i.e. the license key is used as a trusted access control mechanism;
2. to augment the user/group granularity information which has been obtained by the Encoding Agent through other means or to provide it exclusively in scenarios where such information is unavailable or considered untrustworthy.

The Managed Service can also utilize the flexibility provided by license key controlled access (as opposed to static IP) to operate alternative sales models, e.g. pre-pay license packs, self-service provisioning via credit card, etc.

The key may be generated randomly and is preferably of sufficient length to prevent the possibility of a brute force attack. Preferably the Managed Service does not retain a copy of the "license key" (LK), but instead performs a one way secure hash to produce a "secure key" (SK) and stores that instead. This provides the additional benefit that there is a not a single repository for all license keys which could potentially be compromised.

Once the decoding agent has decoded the message appendix, the license key is extracted and (where necessary) passed through an identical one way secure hash, before being used to perform a database lookup which retrieves identification information of varying levels of granularity from within the managed service database (for example, customer, user, group membership).

The identification information obtained from this lookup may be combined with any identification information that may be present in the Message Appendix added by the Encoding Agent, such combination being according to configurable rules.

Absence of a matching license key in the database may be used to indicate that an unauthorized access has been attempted and access may be denied. If the key exists but has been deactivated, access may also be denied.

Figure 3:
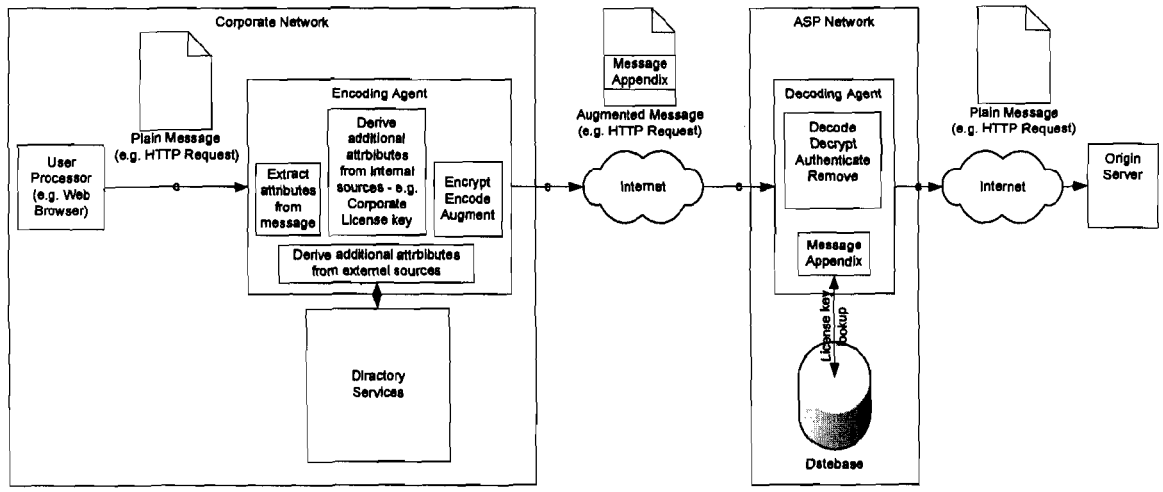
FIG. 3 is a schematic of a system in accordance with a generically applicable embodiment of the present invention as deployed in a corporate network, using a "key" in the message appendix for corporate network authentication.
Figure 4:
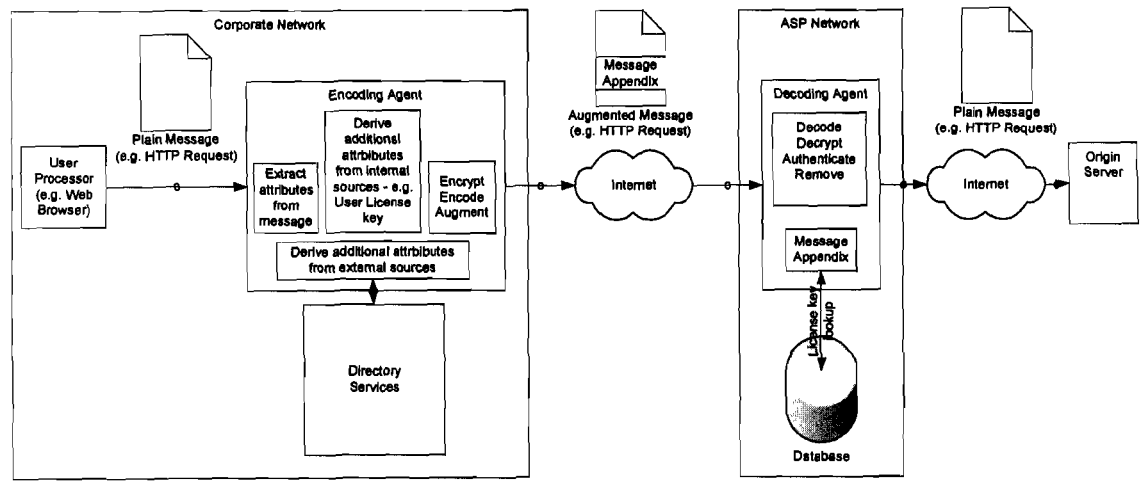
FIG. 4 is a schematic of a system in accordance with a generically applicable embodiment of the present invention as deployed in a corporate network, using a "key" in the message appendix for authenticating a user.

FIGS. 3 and 4 illustrate two currently envisaged situations for License key use.

FIG. 3 illustrates use of a licence key for authenticating a corporate network. An Encoding agent intercepts and augments messages (e.g. HTTP requests) with a message appendix comprising a License key and, optionally, other attributes including, for example from external sources (e.g. from active directory) or internal sources (e.g. local time).

The augmented message is sent to the ASP network, where the license key can then be used in an 'Authenticate' stage within the Decoding agent to establish corporate identity for a request.

FIG. 4 illustrates the use of a licence key for authenticating a single user. The user may, for example, be accessing the service from outside a corporate network, or from inside the corporate network.

The initial setup requires a license key to be issued by a network administrator. License keys may be issued using a graphical user interface provided by the ASP for example. The License key is then specified during the Encoding Agent installation procedure for the particular user's device. Alternatively, the License key may be issued through automated procedure during installation.

Request processing is similar to the case above for authenticating a corporate network.

By adopting this approach, the encoding agent can operate on the end users computer and user level granularity can provided by the license key (used by the decoder as a key to look up additional user relates information from a database accessible to the decoder), rather than necessarily relying on a directory service.

It will be appreciated that the embodiments described above are given by way of example only and many modifications to that which has been specifically described are possible within the scope of the present invention.

The invention claimed is:

1. A method comprising:
at a network processor connected to a local network, intercepting a network communication message originating from a user processor that is different from the network processor connected to the local network and which network communication message is destined for a remote processor connected to the local network via an external network;
creating a unique message appendix for the intercepted network communication message to prevent replay attacks on the intercepted network communication message using:
message attributes extracted directly from the intercepted network communication message,
externally derived attributes derived by querying services external to an encoding agent of the network processor using the extracted message attributes as query parameters, and
internally derived attributes derived by querying services internal to the network processor using message attributes as query parameters,
wherein the unique message appendix contains information associated with the local network that is available at the local network;
encrypting the unique message appendix using a combination of an asymmetric encryption technique that does not require key exchanges and a symmetric encryption technique that is different from the asymmetric encryption technique so that the information in the unique message appendix associated with the local network may be transmitted securely over a public network;
encoding the encrypted unique message appendix to allow the unique message appendix to be added to the network communication message without altering the contents of the network communication message; and
appending the encoded, encrypted unique message appendix to the network communication message for transmission between the network processor connected to the local network and the remote processor.

2. The method of claim 1, wherein creating comprises creating the unique message appendix with information associated with the local network that includes a user's user ID, group membership, phone number, location, address and other information obtained from a local network directory or directories.

3. A method comprising:
at a remote processor connected to a local network via an external network, receiving a network communication message from a network processor connected to the local network, wherein the network communication message includes an encoded and encrypted unique message appendix used to prevent replay attacks on the intercepted network communication message;
decrypting the unique message appendix using a combination of an asymmetric decryption technique that does not require key exchanges and a symmetric decryption technique that is different form the asymmetric decryption technique;
extracting the unique message appendix that was generated from:
message attributes extracted directly from the network communication message,
externally derived attributes derived by querying services external to an encoding agent of the network processor using the extracted message attributes as query parameters, and
internally derived attributes derived by querying services internal to the network processor using message attributes as query parameters; and
processing the unique message appendix to obtain local network information available at the network processor from which the communication message originated.

4. The method of claim 3, further comprising removing the unique message appendix from the network communication message once received by the remote processor.

5. The method of claim 1, wherein creating comprises creating the unique message appendix for the network communication message including information comprising:
local network information obtained from a directory or directories associated with the local network;
state information about the local network, a network user, or a network user group; and
tally information indicating a number of connections made at the local network by the user or the network user group.

6. The method of claim 3, wherein processing comprises processing the network communication message based on information comprising:
local network information obtained from a directory or directories associated with the local network;
state information about the local network, a network user, or a network user group; and
tally information indicating a number of connections made at the local network by the user or the network user group.

7. The method of claim 6, further comprising removing the unique message appendix from the network communication message once received by the remote processor.

8. The method according to claim 6, wherein the local network information includes: user or group level information, a user's user ID, group membership, phone number, location, address and other information obtained from a local network directory or directories.

9. The method according to claim 6, wherein the state information includes other data associated with the network communication message, derived data associated with the network communication message, and/or other information independent of the specific network communication message.

10. The method of claim 1, further comprising executing an encoding agent at the network processor connected to the local network to perform the creating, encrypting, encoding and appending.

11. The method of claim 10, and further comprising the encoding agent intercepting the network communication message in order to append the encrypted appendix.

12. An apparatus comprising:
a network processor configured to connect to a local network, the network processor executing an encoding agent that is configured to:

intercept a network communication message that originates from a user processor connected to the local network and that is destined for a remote processor connected to the local network via an external network;

create a unique message appendix for the intercepted network communication message using:
message attributes extracted directly from the intercepted network communication message,
externally derived attributes derived by querying services external to an encoding agent of the network processor using the extracted message attributes as query parameters, and
internally derived attributes derived by querying services internal to the network processor using message attributes as query parameters,
wherein the unique message appendix contains information associated with the local network that is available at the local network;

encrypt the unique message appendix using a combination of an asymmetric encryption technique that does not require key exchanges and a symmetric encryption technique that is different from the asymmetric encryption technique so that the information in the unique message appendix associated with the local network may be transmitted securely over a public network;

encode the encrypted unique message appendix to allow the unique message appendix to be added to the network communication message without altering the contents of the network communication message; and append the encoded, encrypted unique message appendix to the network communication message for transmission between the network processor connected to the local network and the remote processor.

13. An apparatus comprising:
a network processor configured to connect to a local network via an external network, the network processor executing a decoding agent that is configured to:
receive a network communication message from another network processor connected to the local network, wherein the network communication message includes an encoded and encrypted unique message appendix used to prevent replay attacks on the intercepted network communication message; and
decrypt the unique message appendix using a combination of an asymmetric decryption that does not require key exchanges and a symmetric decryption technique that is different from the asymmetric decryption technique;
extract the unique message appendix that was generated from:
message attributes extracted directly from the network communication message,
externally derived attributes derived by querying services external to an encoding agent of the network processor using the extracted message attributes as query parameters, and
internally derived attributes derived by querying services internal to the network processor using message attributes as query parameters; and
the network processor executing a processing agent that is configured to process the unique message appendix to obtain local network information available at the network processor from which the communication message originated.

14. The apparatus of claim 13, wherein the network processor is configured to execute the processing agent in order to process the network communication based on information comprising:
local network information available from a directory or directories associated with the local network;
state information about the local network, a network user, or a network user group; and
tally information indicating a number of connections made at the local network by the user or the network user group.

15. The apparatus of claim 12, wherein the network processor executes the encoding agent to create the unique message appendix for the network communication message including information comprising:
local network information available from a directory or directories associated with the local network;
state information about the local network, a network user, or a network user group; and
tally information indicating a number of connections made at the local network by the user or the network user group.

16. The apparatus of claim 15, wherein the network processor executes the encoding agent to intercept the network communication in order to append the unique message appendix.

17. The method of to claim 1, wherein the network communication message is an HTTP request, an email communication or an Instant Messaging communication.

18. The method of claim 1, wherein the unique message appendix is incorporated in the network communication message as header information.

19. The method of claim 1, wherein the local network is a corporate network.

20. The method or system according to claim 1, wherein the external network is the Internet.

21. The method of claim 1, wherein intercepting, creating, encrypting, encoding and appending are performed at an Internet-level network processor.

22. The method of claim 21, wherein intercepting, creating, encrypting, encoding and appending are performed at the Internet-level network processor for a web security service.

23. The method of claim 22, wherein intercepting, creating, encrypting, encoding and appending are performed at the Internet-level network processor for any one or more of web virus scanning, web filtering and web spyware screening.

24. The apparatus of claim 12, wherein the network processor executes the encoding agent in order to forward the network communication message to the remote processor.

25. The apparatus of claim 24, wherein the network communication message does not originate from the encoding agent and the network processor executes the encoding agent in order to intercept the network communication.

26. The method of claim 3, further comprising:
executing a decoding agent at the remote processor connected to the local network via the external network to perform the receiving, decrypting and extracting; and
executing a processing agent at the remote processor to perform the processing.

27. The method of claim 1, wherein creating comprises creating the unique message appendix by combining separate data items of a message into a single parseable message and wherein encrypting comprises encrypting the parseable message using a symmetric session key which is itself encrypted using a public key of a service provider proxy server.

28. The method of claim 1, wherein encrypting comprises encrypting the unique message appendix using a Session Key.

29. The method of claim 28, wherein encrypting the unique message appendix using the Session Key comprises using a Decoding Agent Public Key.

30. The method of claim 28, further comprising encoding the Session Key.

31. The apparatus of claim 12, wherein the encoding agent is configured to encrypt the unique message appendix using a Session Key.

32. The apparatus of claim 31, wherein the encoding agent is configured to encrypt the unique message appendix using a Decoding Agent Public Key.

* * * * *